US012634651B2

(12) United States Patent
Leppänen et al.

(10) Patent No.: US 12,634,651 B2
(45) Date of Patent: May 19, 2026

(54) PROCESSING OF AUDIO DATA

(71) Applicant: Nokia Technologies Oy, Espoo (FI)

(72) Inventors: Jussi Artturi Leppänen, Tampere (FI);
Arto Juhani Lehtiniemi, Tampere (FI);
Lasse Juhani Laaksonen, Tampere
(FI); Miikka Tapani Vilermo, Tampere
(FI)

(73) Assignee: Nokia Technologies Oy, Espoo (FI)

( * ) Notice: Subject to any disclaimer, the term of this
patent is extended or adjusted under 35
U.S.C. 154(b) by 240 days.

(21) Appl. No.: 18/261,557

(22) PCT Filed: Jan. 20, 2022

(86) PCT No.: PCT/EP2022/051202
§ 371 (c)(1),
(2) Date: Jul. 14, 2023

(87) PCT Pub. No.: WO2022/161840
PCT Pub. Date: Aug. 4, 2022

(65) Prior Publication Data
US 2024/0089688 A1 Mar. 14, 2024

(30) Foreign Application Priority Data

Jan. 28, 2021 (EP) ..................................... 21153938

(51) Int. Cl.
*H04S 7/00* (2006.01)
*G06F 3/01* (2006.01)
(52) U.S. Cl.
CPC .............. *H04S 7/303* (2013.01); *G06F 3/017*
(2013.01)
(58) Field of Classification Search
None
See application file for complete search history.

(56) References Cited

U.S. PATENT DOCUMENTS

| | | | |
|---|---|---|---|
| 11,290,837 B1 * | 3/2022 | Brimijoin, II | .......... H04S 7/304 |
| 2012/0257036 A1 | 10/2012 | Stenberg et al. | |

(Continued)

FOREIGN PATENT DOCUMENTS

| | | | |
|---|---|---|---|
| JP | H09-90963 A | 4/1997 | |
| JP | 7114531 B2 * | 8/2022 | ........... H04R 1/1041 |
| KR | 20180118034 A | 10/2018 | |

OTHER PUBLICATIONS

Lee et al, "JP7114531B2 Ear Set Control Method and System".
English translation by EPO. 12 pages. (Year: 2019).*

(Continued)

*Primary Examiner* — Qin Zhu
(74) *Attorney, Agent, or Firm* — McCarter & English,
LLP

(57) ABSTRACT

An apparatus, method and computer program is disclosed.
The apparatus may comprise means for providing audio data
for output to a user device, the audio data representing a
virtual space comprising a plurality of sounds located at
respective spatial locations within the virtual space, the
plurality of sounds being respectively associated with a
plurality of sound sources. The apparatus may also comprise
means for detecting a predetermined gesture associated with
a user identifying one of the plurality of sound sources to be
a sound source of interest, determining a directional vector
between a position of the user at a time of detecting the
predetermined gesture and a position of the sound source of
interest in the virtual space, and processing the audio data
such that sounds at least in the direction of the directional
vector are modified when output to the user device.

17 Claims, 7 Drawing Sheets

(56) References Cited

U.S. PATENT DOCUMENTS

| | | | |
|---|---|---|---|
| 2014/0129937 A1 | 5/2014 | Jarvinen et al. | |
| 2020/0265860 A1* | 8/2020 | Mouncer .................. | H04R 5/04 |

OTHER PUBLICATIONS

Office action received for corresponding European Patent Application No. 21153938.2, dated Apr. 5, 2024, 6 pages.

"Ambisonics", Wikipedia, Retrieved on Jul. 20, 2023, Webpage available at : https://en.wikipedia.org/wiki/Ambisonics#Virtual_microphones.

Politis et al., "Parametric Spatial Audio Effects", Proceedings of the 15th International Conference on Digital Audio Effects (DAFx12), Sep. 17-21, 2012, pp. 1-8.

Extended European Search Report received for corresponding European Patent Application No. 21153938.2, dated Jun. 9, 2021, 8 pages.

Schultz-Amling et al., "Acoustical Zooming Based on a Parametric Sound Field Representation", Audio Engineering Society, May 2010, pp. 1310-1318.

Kallinger et al., "Spatial filtering using directional audio coding parameters", IEEE International Conference on Acoustics, Speech and Signal Processing, Apr. 19-24, 2009, pp. 217-220.

International Search Report and Written Opinion received for corresponding Patent CooperationPCT/EP2022/051202, dated May 4, 2022, 12 pages.

* cited by examiner

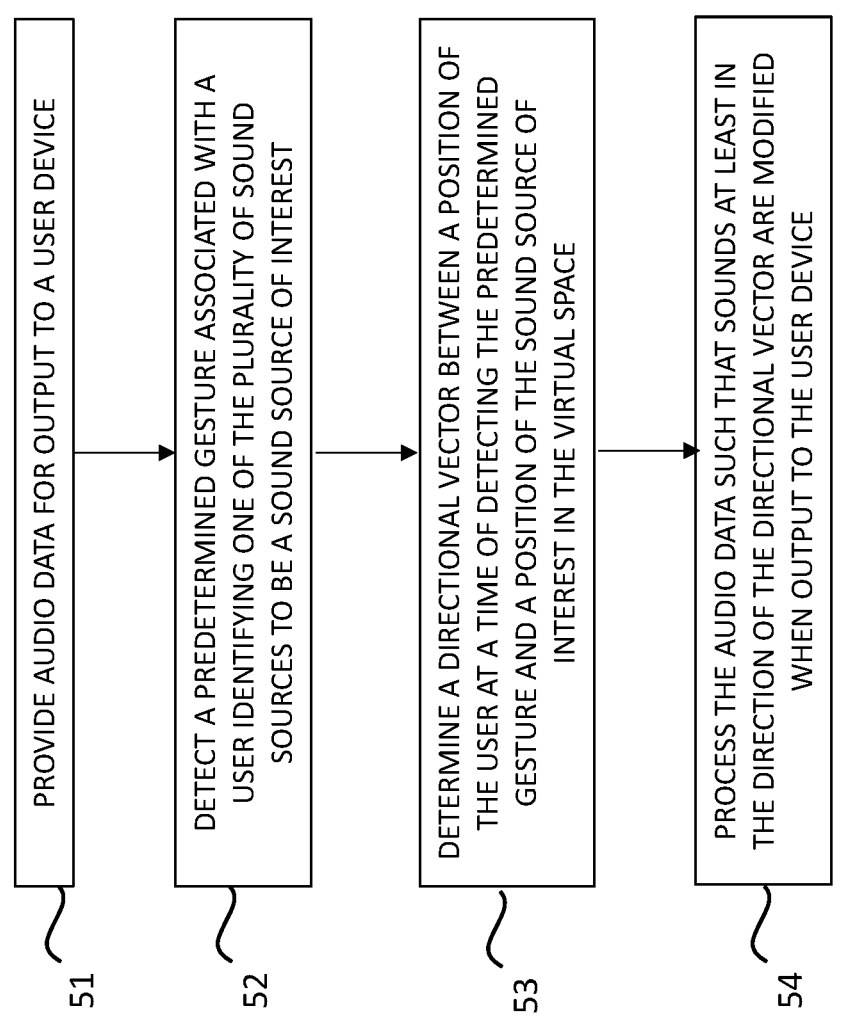

51 — PROVIDE AUDIO DATA FOR OUTPUT TO A USER DEVICE

52 — DETECT A PREDETERMINED GESTURE ASSOCIATED WITH A USER IDENTIFYING ONE OF THE PLURALITY OF SOUND SOURCES TO BE A SOUND SOURCE OF INTEREST

53 — DETERMINE A DIRECTIONAL VECTOR BETWEEN A POSITION OF THE USER AT A TIME OF DETECTING THE PREDETERMINED GESTURE AND A POSITION OF THE SOUND SOURCE OF INTEREST IN THE VIRTUAL SPACE

54 — PROCESS THE AUDIO DATA SUCH THAT SOUNDS AT LEAST IN THE DIRECTION OF THE DIRECTIONAL VECTOR ARE MODIFIED WHEN OUTPUT TO THE USER DEVICE

FIG. 5

PROCESSING OF AUDIO DATA

RELATED APPLICATION

This application claims priority to PCT Application No. PCT/EP2022/051202, filed on Jan. 20, 2022, which claims priority to EP Application Serial No. 21153938.2, filed on Jan. 28, 2021, each of which is incorporated herein by reference in its entirety.

FIELD

Example embodiments relate to an apparatus, method and computer program for processing of audio data, for example processing of spatial audio data which may represent a plurality of sounds at respective spatial locations within a virtual space.

BACKGROUND

Spatial audio may refer to audio which has a spatial percept such that different sounds can be perceived as coming from different locations in a virtual space when heard through audio output transducers such as earphones, headphones or loudspeakers.

For example, Ambisonics is a spatial audio format in which sounds from real-world sound sources may be captured by a microphone array, the captured sounds being represented in spatial audio data with respective directional components indicative of where the particular sounds came from relative to the microphone array.

Spatial audio may be provided as part of a Virtual Reality (VR) system which may provide a virtual space for user exploration during a consumption phase. A virtual space may any computer-generated version of a space, for example a captured real-world space, in which a user can be immersed through a user device. The user device may have a pair of displays and/or a pair of audio output transducers, e.g. earphones, headphones or loudspeakers. A VR headset is an example of a user device in this context.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus comprising means for: providing audio data for output to a user device, the audio data representing a virtual space comprising a plurality of sounds located at respective spatial locations within the virtual space, the plurality of sounds being respectively associated with a plurality of sound sources; detecting a predetermined gesture associated with a user identifying one of the plurality of sound sources to be a sound source of interest; determining a directional vector between a position of the user at a time of detecting the predetermined gesture and a position of the sound source of interest in the virtual space; and processing the audio data such that sounds at least in the direction of the directional vector are modified when output to the user device.

The sounds which are modified may comprise one or more sounds.

The processing means may be configured to modify the sounds as a position of the user changes.

The apparatus may further comprise means for generating a directional beam pattern in the direction of the directional vector, the processing means processing the audio data by modifying audio data corresponding to the directional beam pattern.

The apparatus may further comprise means for determining a distance between the position of the user in the virtual space and the position of the sound source of interest, and wherein the generated directional beam pattern is configured to have a beam width that is dependent on the determined distance. The beam width of the generated directional beam pattern may become greater as the determined distance becomes smaller. The beam width may be further dependent on a duration of the detected predetermined gesture.

The audio data may be captured by a spherical microphone array.

The processing means may be configured to modify the audio data such that a gain associated with sounds in the direction of the directional vector is or are increased.

The processing means may be configured to modify the audio data such that a diffuseness associated with sounds in the direction of the directional vector is or are decreased.

The amount of modification may be further dependent on a duration of the detected predetermined gesture.

The detecting means may be configured to detect the predetermined gesture responsive to detecting a change in orientation of at least part of the user's body.

The apparatus may further comprise means for determining an orientation of the user's head, wherein the detecting means may be configured to detect the predetermined gesture responsive to detecting a change in orientation of the user's head above a predetermined first angular threshold.

The apparatus may further comprise means for determining an orientation of the user's upper body with respect to the user's lower body, wherein the detecting means is configured to detect the predetermined gesture responsive to further detecting a change in orientation of the upper body with respect to the lower body above a predetermined second angular threshold indicative of a downwards leaning motion.

The audio data may be associated with video data for output to the user device, the video data representing at least part of the virtual space, wherein the detecting means may be further configured not to detect the predetermined gesture in the event that the changed orientation of the user's head corresponds to the user viewing a visual object represented by the video data.

The detecting means may be configured to detect the predetermined gesture responsive to detecting that the changed orientation of the part of the user's body is maintained for at least a predetermined period of time.

The directional vector may be determined based on a position of a body part of the user after detection of the predetermined gesture.

The apparatus may further comprise means for determining a position of the user's ear and wherein the directional vector is determined as that extending outwards from the user's ear.

The position of the user's ear may comprise the position of the ear which moves downwards with the downwards leaning motion of the predetermined gesture.

The provided audio data may be in an Ambisonics format or another surround sound or spatial sound format in which translational movement of a user does not modify gain associated with sounds when output to the user device.

According to a second aspect, this specification describes a method, comprising providing audio data for output to a user device, the audio data representing a virtual space comprising a plurality of sounds located at respective spatial locations within the virtual space, the plurality of sounds being respectively associated with a plurality of sound sources; detecting a predetermined gesture associated with a user identifying one of the plurality of sound sources to be a sound source of interest; determining a directional vector between a position of the user at a time of detecting the predetermined gesture and a position of the sound source of interest in the virtual space; and processing the audio data such that sounds at least in the direction of the directional vector are modified when output to the user device.

The sounds which are modified may comprise one or more sounds.

The method may also comprise modifying the sounds as a position of the user changes.

The method may also comprise generating a directional beam pattern in the direction of the directional vector, the audio data being processed by modifying audio data corresponding to the directional beam pattern.

The method may also comprise determining a distance between the position of the user in the virtual space and the position of the sound source of interest, and wherein the generated directional beam pattern is configured to have a beam width that is dependent on the determined distance. The beam width of the generated directional beam pattern may become greater as the determined distance becomes smaller. The beam width may be further dependent on a duration of the detected predetermined gesture.

The audio data may be captured by a spherical microphone array.

The processing may modify the audio data such that a gain associated with sounds in the direction of the directional vector is or are increased.

The processing may modify the audio data such that a diffuseness associated with sounds in the direction of the directional vector is or are decreased.

The amount of modification may be further dependent on a duration of the detected predetermined gesture.

Detecting the predetermined gesture may be responsive to detecting a change in orientation of at least part of the user's body. The predetermined gesture may be detected responsive to detecting a change in orientation of the user's head above a predetermined first angular threshold.

The method may also comprise determining an orientation of the user's upper body with respect to the user's lower body, wherein the detecting may be responsive to further detecting a change in orientation of the upper body with respect to the lower body above a predetermined second angular threshold indicative of a downwards leaning motion.

The audio data may be associated with video data for output to the user device, the video data representing at least part of the virtual space, wherein the predetermined gesture may not be detected in the event that the changed orientation of the user's head corresponds to the user viewing a visual object represented by the video data.

The predetermined gesture may be detected responsive to detecting that the changed orientation of the part of the user's body is maintained for at least a predetermined period of time.

The directional vector may be determined based on a position of a body part of the user after detection of the predetermined gesture.

The method may also comprise determining a position of the user's ear and wherein the directional vector is determined as that extending outwards from the user's ear. The position of the user's ear may comprise the position of the ear which moves downwards with the downwards leaning motion of the predetermined gesture.

The provided audio data may be in an Ambisonics format or another surround sound or spatial sound format in which translational movement of a user does not modify gain associated with sounds when output to the user device.

According to a third aspect, this specification describes a computer program comprising instructions for causing an apparatus to perform at least the following: providing audio data for output to a user device, the audio data representing a virtual space comprising a plurality of sounds located at respective spatial locations within the virtual space, the plurality of sounds being respectively associated with a plurality of sound sources; detecting a predetermined gesture associated with a user identifying one of the plurality of sound sources to be a sound source of interest; determining a directional vector between a position of the user at a time of detecting the predetermined gesture and a position of the sound source of interest in the virtual space; and processing the audio data such that sounds at least in the direction of the directional vector are modified when output to the user device.

Example embodiments of the third aspect may also provide any feature of the second aspect.

According to a fourth aspect, this specification describes a computer-readable medium (such as a non-transitory computer-readable medium) comprising program instructions stored thereon for performing at least the following providing audio data for output to a user device, the audio data representing a virtual space comprising a plurality of sounds located at respective spatial locations within the virtual space, the plurality of sounds being respectively associated with a plurality of sound sources; detecting a predetermined gesture associated with a user identifying one of the plurality of sound sources to be a sound source of interest; determining a directional vector between a position of the user at a time of detecting the predetermined gesture and a position of the sound source of interest in the virtual space; and processing the audio data such that sounds at least in the direction of the directional vector are modified when output to the user device.

According to a fifth aspect, this specification describes an apparatus comprising: at least one processor; and at least one memory including computer program code which, when executed by the at least one processor, causes the apparatus to: provide audio data for output to a user device, the audio data representing a virtual space comprising a plurality of sounds located at respective spatial locations within the virtual space, the plurality of sounds being respectively associated with a plurality of sound sources; detect a predetermined gesture associated with a user identifying one of the plurality of sound sources to be a sound source of interest; determine a directional vector between a position of the user at a time of detecting the predetermined gesture and a position of the sound source of interest in the virtual space; and process the audio data such that sounds at least in the direction of the directional vector are modified when output to the user device.

BRIEF DESCRIPTION OF DRAWINGS

Example embodiments will now be described, by way of non-limiting example, with reference to the accompanying drawings, in which:

FIG. 5 is a flow diagram showing processing operations according to some example embodiments;

DETAILED DESCRIPTION

Example embodiments relate to methods, computer programs and apparatuses for processing audio data, for example processing audio data which may represent a virtual space comprising a plurality of sounds at respective spatial locations within the virtual space.

The audio data may therefore be spatial audio data.

The spatial audio data may or may not be accompanied by video data, for example video data representing video content comprising images of one or more sound sources located at respective spatial locations within the virtual space.

Example embodiments may therefore relate to extended reality (XR) methods and apparatuses, for example virtual reality (VR), augmented reality (AR) and/or mixed reality (MR) methods and apparatuses.

Example embodiments will focus on a VR system and method, but it should be understood that embodiments are applicable to any system or method that involves processing of audio which has a spatial percept such that different sounds can be perceived by a listening user as emanating from different locations in a virtual 'listening' space for output to a user device.

For example, as mentioned above, Ambisonics is a spatial audio format in which sounds from sound sources can be captured by a spherical microphone array and the captured sounds may be represented in resulting audio data as coming from spatial directions relative to the spherical microphone array.

Figures 1, 2:
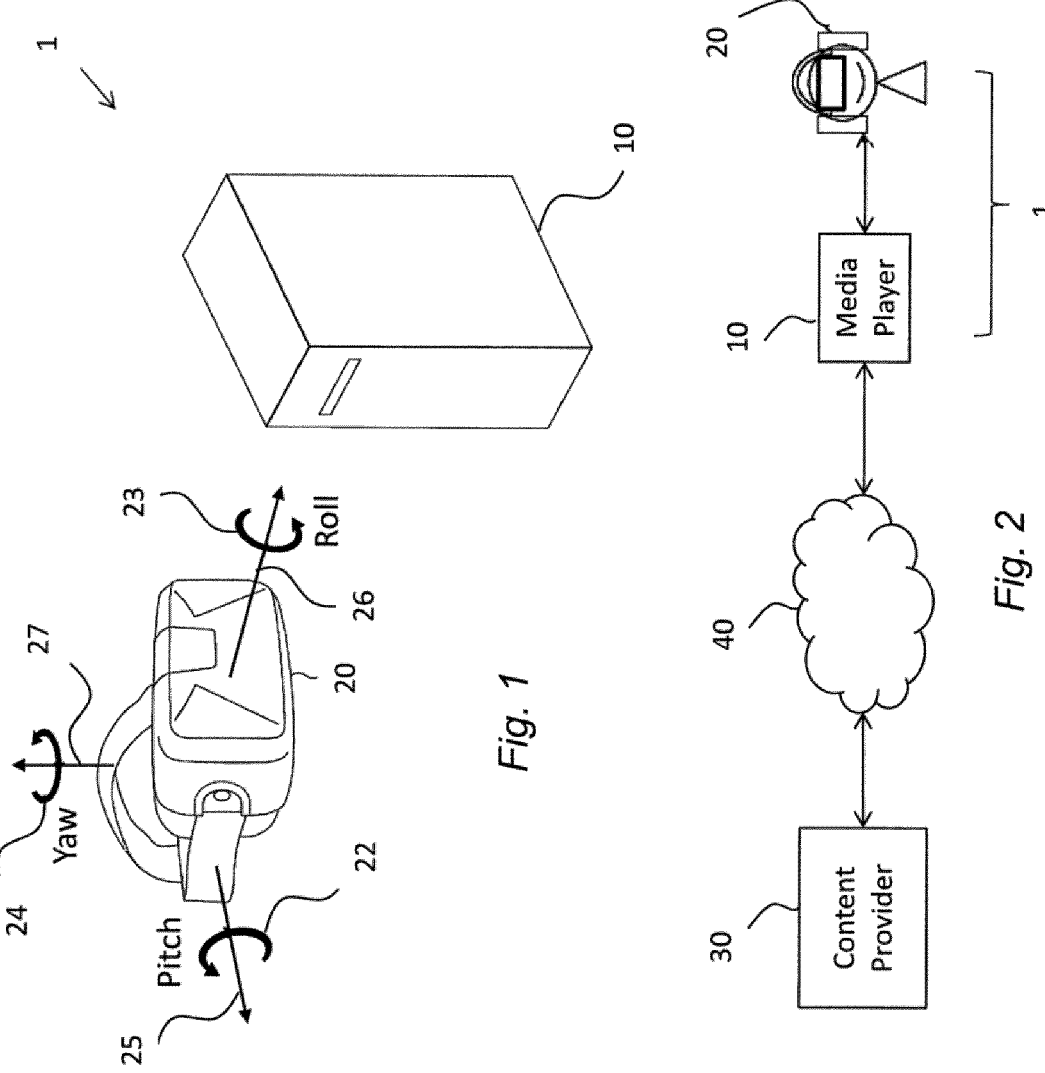
FIG. 1 is a perspective view of a virtual reality system.
FIG. 2 is a schematic view of a network including the FIG. 1 virtual reality system.

FIG. 1 is a schematic illustration of a VR system 1 which represents user-end equipment. The VR system 1 includes a user device in the form of a VR headset 20 for outputting video and audio data for a virtual space, and a VR media player 10 for rendering the video and audio data at the VR headset 20. The VR headset 20 may comprise two video screens for displaying video data and two audio output transducers, e.g. earphones, headphones or loudspeakers, for output of audio data.

In some example embodiments, a separate user control (not shown) may be associated with the VR system 1, e.g. a hand-held controller.

In the context of this specification, a virtual space may be any computer-generated version of a space, for example a captured real-world space in which a user can be immersed. In some example embodiments, the virtual space may be entirely computer-generated, i.e. not captured. The VR headset 20 may be of any suitable type. The VR headset 20 may be configured to provide VR video and audio data to a user by means of the above-mentioned video screens and audio output transducers. As such, a user may be immersed in the virtual space and may explore the virtual space by means of movement.

The VR headset 20 may receive the video and audio data from the VR media player 10.

The VR media player 10 may be part of a separate device which is connected to the VR headset 20 by a wired or wireless connection. For example, the VR media player 10 may comprise a games console, a PC, laptop or tablet computer configured to communicate the video and audio data to the VR headset 20.

Alternatively, the VR media player 10 may form part of the VR headset 20.

The VR system 1 may include means for determining a position of the user. The position of the user may include the spatial position of the user and/or an orientation of the user or part of the user's body.

For example, the VR system 1 may be configured to determine the spatial position of the user by means of determining the spatial position of the VR headset 20. Over successive time frames, a measure of movement may therefore be determined based on the different spatial positions of the VR headset 20.

For example, the VR headset 20 may comprise motion tracking sensors which may include one or more of gyroscopes, accelerometers and structured light systems. Alternatively, or additionally, the VR headset 20 may comprise a positioning receiver, such as a Global Navigation Satellite System (GNSS) receiver and/or another positioning system such as a WiFi positioning receiver or a cellular positioning receiver which operate based on, for example, measurement of Angle of Arrival (AoA), Time of Arrival (ToA) and/or Received Signal Strength Indication (RSSI) information.

Spatial position and movement of the user may also be determined using one or more cameras configured to detect and track user movement, possibly in conjunction with one or more markers or sensors carried by the user or placed on the VR headset 20.

The VR system 1 may also comprise means for determining an orientation of part of the user's body, for example orientation of the user's head. This may also be determined by determining an orientation of the VR headset 20 using, for example, motion tracking sensors as mentioned above. Over successive time frames, a measure of a change in orientation of the user's head may therefore also be determined, e.g. to identify an amount of rotational change.

The orientation of the user's head may also be determined using one or more cameras configured to detect and track head orientation, possibly in conjunction with one or more markers or sensors carried by the user or placed on the VR headset 20.

The VR system 1 may also comprise means for determining an orientation of one part of the user's body with respect to another part of the user's body.

For example, the VR system 1 may determine the orientation of an upper body part (e.g. torso) of the user with respect to a lower body part (e.g. legs) of the user. This may enable the VR system 1 to identify, for example, a downwards leaning motion based on a detected change in upper body orientation with respect to lower body orientation.

The orientation of the user's upper body with respect to the lower body may also be determined using one or more cameras configured to detect and track the upper and lower body parts, possibly in conjunction with one or more markers or sensors carried by the user.

Determining the spatial position of the user and their head orientation enables the VR system 1 to track the user, for example to determine a current visual field-of-view (FOV) which may determine which video and audio data to output to the user via the VR headset 20. Determining the spatial position of the user and/or other movements, e.g. orientation changes and movements of individual body parts, also enables the VR system 1 to determine a gesture of the user which may correspond to a predetermined gesture for performing some operation, as will be explained below.

Data which represents, or from which can be derived, a spatial position of the user, an orientation of a user's body part and/or position of a user's body part may be referred to herein as position or positional data.

FIG. 1 indicates respective orientations of pitch 22, roll 23 and yaw 24 and also translational movement in Euclidean space along side-to-side, front-to-back and up-and-down axes 25, 26, 27. These represent so-called six-degrees-of freedom (6DoF) which a user may change when exploring or consuming a virtual space represented by video and audio data.

Referring to FIG. 2, a content provider 30 may store and transmit, e.g. by streaming, video and audio data representing a particular virtual space for output to the VR headset 20.

Responsive to receive or download requests sent by the VR media player 10, the content provider 30 may stream the video and audio data over a network 40, which may be any network, for example an IP network such as the Internet.

The remote content provider 30 may or may not be at the location or system where the video and audio data is captured, created and/or processed.

For illustration purposes, we may assume that the content provider 30 also captures, encodes and stores the video and audio data, as well as streaming it responsive to signals from the VR system 1.

Figure 3:
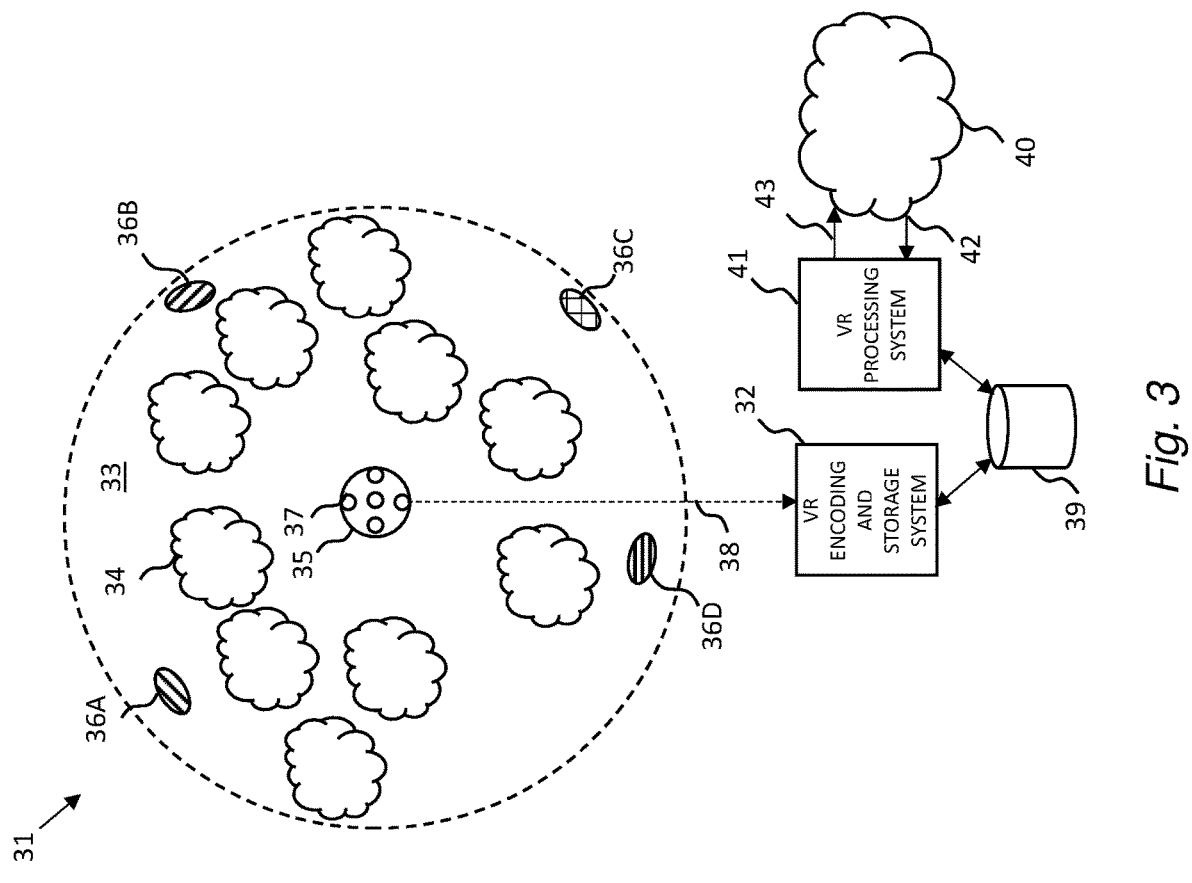
FIG. 3 is a schematic top-plan view of a virtual reality capture scenario.

Referring to FIG. 3, an overview of an example VR capture scenario 31 is shown. The VR 25 example capture scenario 31 assumes that both video and audio data is captured, but it will be appreciated that embodiments are applicable to audio-only capture.

FIG. 3 shows in plan-view a real-world space 33 which may be, for example, an outdoor space such as forest comprising a plurality of trees 34.

A VR capture device 35 for video and audio capture may be supported on a floor of the real-world space 33 in front of one or more objects which may include, in addition to the trees 34, real-world sound sources (e.g. objects) including first, second, third and fourth sound sources 36A, 36B, 36C and 36D.

A sound source may be any object, e.g. a real-world object, which produces a sound during audio capture by the VR capture device 35. The first to fourth sound sources 36A-36D may be static objects or objects which may move over time. For example, the first sound source 36A may be a bird singing, the second sound source 36B may be leaves rustling due to wind, the third sound source 36C may be a bear growling, and the fourth sound source 36D may be wolf howling.

The VR capture device 35 may comprise at least one camera and microphone array, in which individual cameras and individual microphone elements are provided on a body of the VR capture device. The individual cameras and individual microphones may have respective orientations or directions towards the real-world space 33. As such, each individual camera may capture a particular portion (or video data set) of the real-world space 33 and, similarly, each individual microphone element may capture sounds from a particular portion or beam of the real-world space to which it is directed.

The VR capture device 35 may, for example, be a spherical capture device in which individual cameras and individual microphone elements of the array have respective orientations/directions around a spherical surface of the VR capture device which project generally outwards from a position at the centre of the VR capture device.

In FIG. 3, a reference numeral 37 indicates a location of a particular camera and microphone element on the VR capture device 35. It will be understood that different locations may be used for cameras and microphone elements.

Examples of known spherical capture devices include MG Acoustics LLC's "EigenMike" (audio only) and Nokia's "OZO" camera (video and audio).

The VR capture device 35 may provide, via a data line 38, captured video and audio data to a VR encoding and storage system 32. The VR encoding and storage system 32 may encode the video and audio data using any suitable format. For example, the video data may be encoded using the Moving Picture Experts Group (MPEG)-1 standard and the audio data may be encoded using a spatial audio format, such as the above-mentioned Ambisonics audio format or the Higher-Order Ambisonics (HOA) format.

The encoded video and audio data may be stored on a storage device 39 which may be internal or external to the VR encoding and storage system 32. The storage device 39 may be any suitable form of memory, such as given in examples below.

A VR processing system 41 may also be associated with the content provider 30.

The VR processing system 41 may be configured to determine a portion of the stored video data and audio data to send over the network 40 to the VR system 1 based on a current position and/or orientation of a user of the VR system 1.

This portion of video and audio data may be determined by means of receiving from the VR system 1 position data indicative of said current position and/or orientation of the user as described above.

The position data may be received by the VR processing system 41 over a signal line 42. The VR processing system 41 may retrieve the appropriate portion of the video and audio data from the storage device 35 and may transmit the video and audio data over a signal line 43 to the VR system 1 via the network 40.

The VR processing system 41 may send the portion of the video and audio data over the signal line 43 using a streaming server (not shown) for example.

The VR processing system 41 may also be configured to perform audio processing according to one or more example embodiments which will be described below.

Alternatively, and for the avoidance of doubt, the audio processing according to one or more example embodiments may be performed by a different VR processing system which may be part of the user-end VR system 1 (e.g. the VR media player 10) using the portion of video and audio data received from the VR processing system 41 over the network 40.

Alternatively, and for the avoidance of doubt, the encoded video and audio data which represents the virtual space may not be streamed over the network 40 to the VR system 1.

Rather, the encoded video and audio data may instead be stored by VR system 1, e.g. on a local memory of the VR media player 10 or on a removable medium connected to or inserted within the VR media player. In this case, the position data indicative of a current position and/or orientation of the user of the VR system 1 need not be transmitted over the network to the content provider 30. All processing may be performed by the VR media player 10 based on positional data received from the VR headset 20.

Figures 4A, 4B:
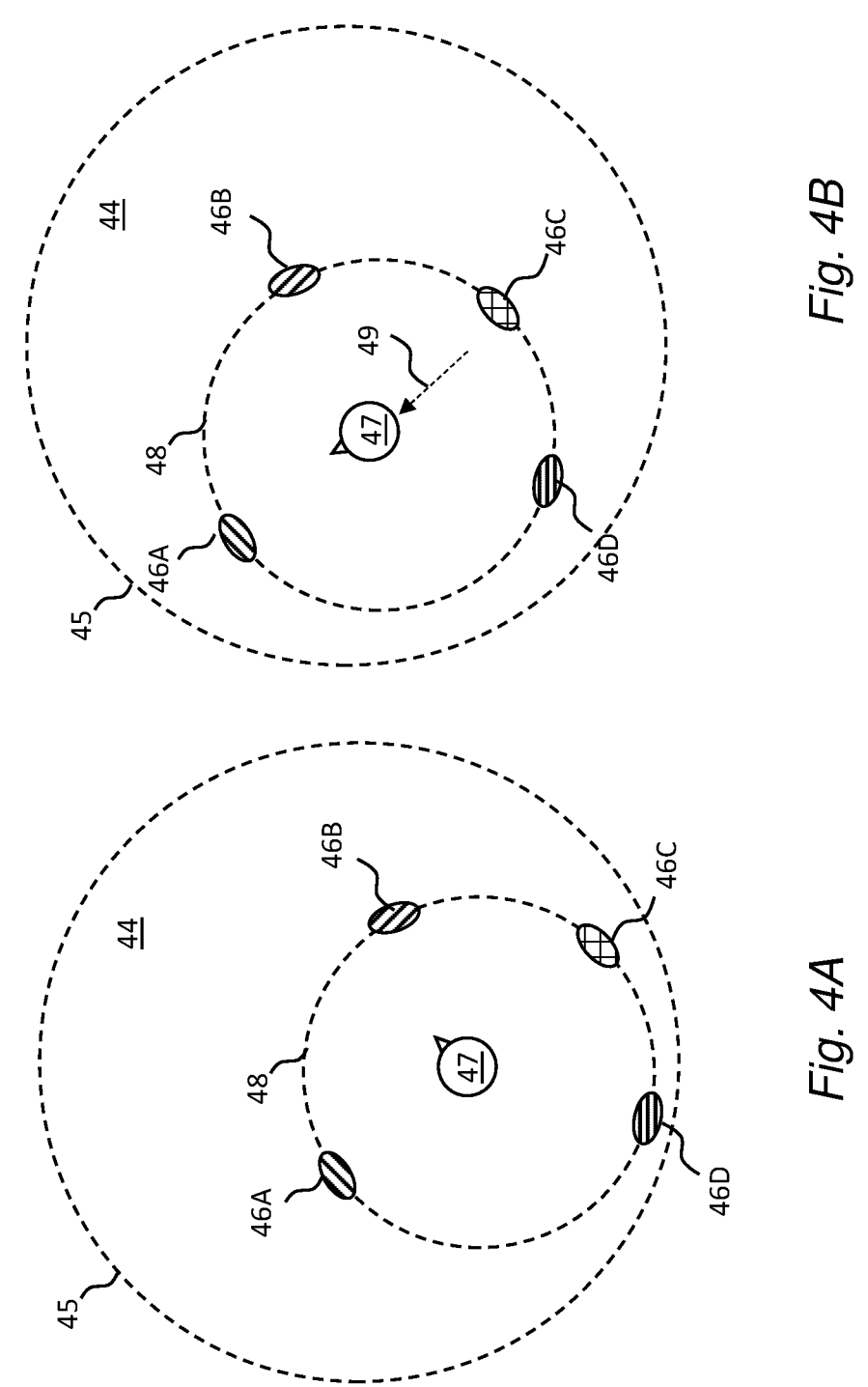
FIGS. 4A and 4B are a schematic top-plan views illustrating a consumption phase of virtual reality content at respective first and second times.

FIGS. 4A and 4B indicate a consumption phase of the encoded video and audio data which may be useful for understanding example embodiments to be described below. FIG. 4A represents a top plan view of a consumption scenario at current time instance, and FIG. 4B represents the top plan view of the consumption scenario at a subsequent time instance.

Referring to FIG. 4A, a real-world space 44 is shown within a boundary 45. The real-world space 44 is different from the real-world space 33 described above with reference to FIG. 3 (i.e. the capture space) and is likely to be a room or area associated with a user 47 of the VR system 1.

In some example embodiments, the VR system 1 may trigger output of the video and audio data, for example when the position of the user 47 crosses the boundary 45. Other forms of triggering condition may be used.

From the perspective of the user 47, the audio data that is output to the VR headset 20 may represent first to fourth sounds 46A-46D which correspond to sounds of the respective first to fourth sound sources 36A-36D, perceived from their respective spatial orientations. The current position of the user 47 determines the centre of a virtual sound field 48 around which the first to fourth sounds 46A-46D are arranged, as if the user is standing in place of the VR capture device 35 with respect to the virtual sound field.

As shown in FIG. 4B, if the user 47 changes orientation, e.g. performs a leftwards rotational movement or moves only their head in this manner, the audio data may be processed based on resulting positional data such that the first to fourth sounds 46A-46D are heard from consistent directions, notwithstanding that the video data the user sees may change due to the change in orientation.

The audio data may be tracked using three-degrees-of-freedom (3DoF) meaning that its output is modified responsive to changes in orientation (pitch, roll, yaw) but not necessarily changes in translational movement of the user 47. This is the case for Ambisonics, HOA, and certain other spatial audio formats. 3DoF audio formats may not comprise information other than the sounds and their respective directions relative to the VR capture device 35. 3DoF formats may not include, for example, information on distances or positions of the captured sound sources, e.g. the first to fourth sound sources 36A-36D.

As such, whilst 3DoF audio formats provide a storage and processing-efficient way of encoding spatial audio data, in cases where the user wishes to explore the virtual space using six-degrees-of-freedom (6DoF), the resulting audio may be unrealistic and/or limiting in terms of how the user perceives the virtual space.

For example, as shown in FIG. 4B, a translational movement 49 of the user 47 towards the first sound 46A does not result in the sound being perceived as getting nearer, e.g. louder, as might be expected. Rather, the virtual sound field 48 is perceived as following the user as they explore the virtual space in terms of translational movement.

FIG. 5 is a flow diagram showing processing operations according to some example embodiments which may provide a more realistic and intuitive representation of a virtual space during exploration in 6DoF. For example, the processing operations may be performed by hardware, software, firmware or a combination thereof. The processing operations may, for example, be performed by the VR processing system 41 and/or by a processing system of the VR media player 10.

A first operation 51 may comprise providing audio data for output to a user device.

The audio data may represent a virtual space comprising a plurality of sounds located at respective spatial locations within the virtual space, the plurality of sounds being respectively associated with a plurality of sound sources.

A second operation 52 may comprise detecting a predetermined gesture associated with a user identifying one of the plurality of sound sources to be a sound source of interest.

A third operation 53 may comprise determining a directional vector between a position of the user at a time of detecting the predetermined gesture and a position of the sound source of interest in the virtual space.

A fourth operation 54 may comprise processing the audio data such that sounds at least in the direction of the directional vector are modified when output to the user device.

Regarding the first operation 51, the user device may be (but is not limited to) the VR headset 20 shown in FIG. 1. The virtual space may comprise the virtual sound field 48 shown in FIGS. 4A and 4B. The plurality of sounds may comprise the first to fourth sounds 46A-46D shown in FIGS. 4A and 4B and the plurality of sound sources may comprise the first to fourth sound sources 36A-36D shown in FIG. 3.

Regarding the second operation 52, the predetermined gesture may comprise any detectable motion of the user 47 or a part of the user's body. This detection may be by means of using any of the above-mentioned methods of position determination, e.g. using position data from one or more motion sensors on the VR headset 20, one or more cameras which are pointed at the user 47 and/or one or more positioning markers or sensors carried by the user, e.g. on one or more parts of their body.

The position data may be used by the VR processing system 41 and/or by the VR media player 10 to perform the second operation 52.

For example, the predetermined gesture may comprise a hand, arm or leg motion or a combination thereof. For example, the predetermined gesture may comprise a pointing gesture in the direction of one of the sounds, such as one of the first to fourth sounds 46A-46D to identify it as a sound source of interest.

For example, the predetermined gesture may be based on a detected change in orientation of at least part of a user's body.

For example, the predetermined gesture may correspond to a detected change in orientation of a user's head being above a predetermined first angular threshold α1.

Figures 6, 7:
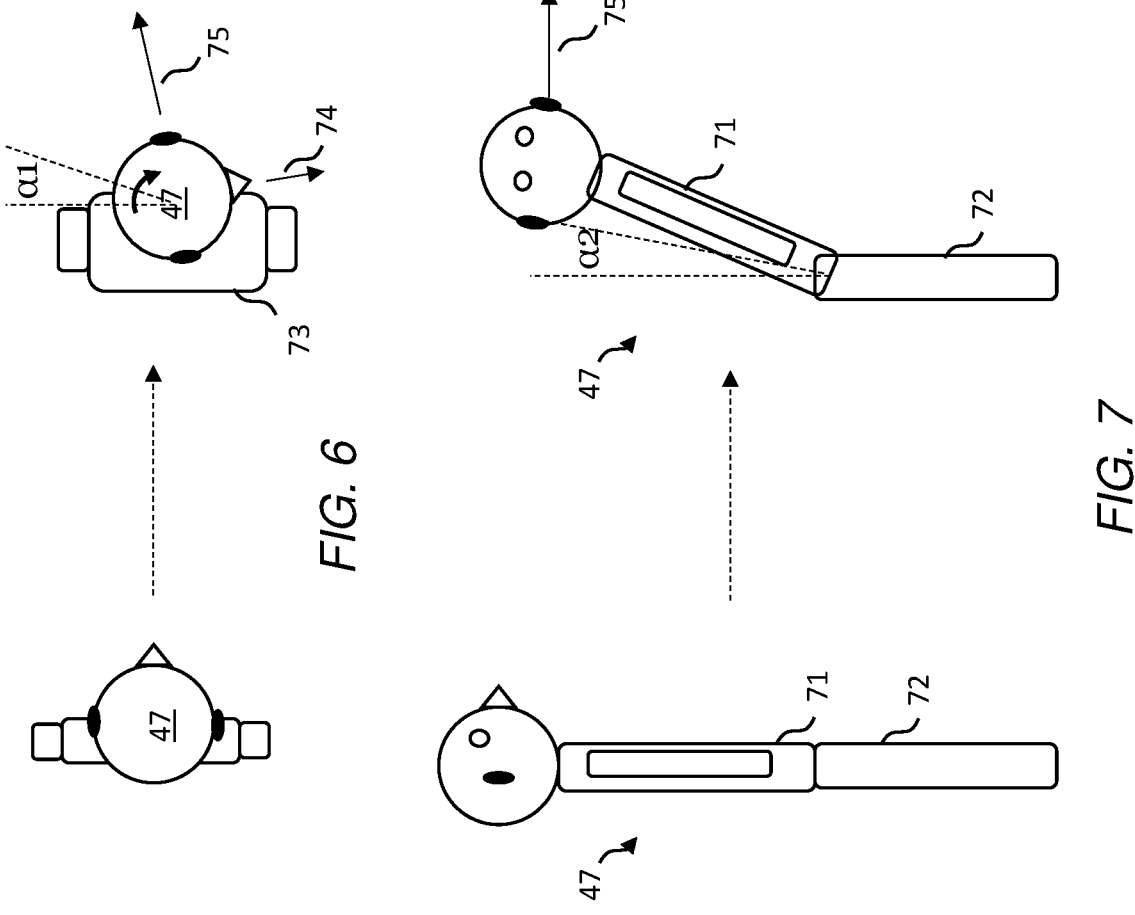
FIG. 6 is a schematic side-view of a user performing a gesture which may be detected according to some example embodiments.
FIG. 7 is a schematic side-view of a user of a user performing a different gesture which may be detected according to some example embodiments.

FIG. 6 shows a plan view of the user 47 exhibiting a detectable rotational change of the head greater than, for example, α1=10 degrees, which may comprise the predetermined gesture.

For example, the predetermined gesture may also be based on an orientation of the user's upper body with respect to the user's lower body.

For example, in addition to a change in orientation of the user's head, the predetermined gesture may correspond to a detected change in orientation of the upper body with respect to the lower body, e.g. indicative of a downwards leaning motion.

The change in orientation may need to be above a predetermined second angular threshold α2, as indicated in FIG. 7, which shows side views of the user 47 corresponding to FIG. 6.

For example, in addition to a rotational change of the head greater than 10 degrees, the predetermined gesture may require the upper body to lean downwards by greater than, for example, α2=15 degrees. The upper body (e.g. torso) is indicated in FIG. 7 by reference numeral 71 and the lower body (e.g. legs) is indicated by reference numeral 72.

If it is not possible to determine the angle between the upper body 71 with respect to the lower body 72, which may be the case if only head tracking is available, some example embodiments may estimate the user's head orientation with respect to the user's shoulders 73. The angle of the user's shoulders 73 may be estimated based on the direction of the most recent translational movement of the user 47.

In some example embodiments, detection of the predetermined gesture may be responsive to detecting that the changed orientation (whether head or head and upper body 71) is maintained for at least a predetermined period of time, e.g. more than 1 second. This avoids unintended detections.

In some example embodiments, where the audio data is associated with video data for output to the user device, e.g. the VR headset 20, it may be determined not to detect the predetermined gesture in the event that the changed head orientation corresponds to the user viewing a visual object represented by the video data. The visual object may have certain properties likely to make it a possible object of visual interest, e.g. if it is above a certain size, if it is moving or represents a particular type of object. This may avoid the situation where, for example, the user 47 in FIG. 6 effects the change in orientation in order to view an object of interest in a particular direction 74 rather than to initiate audio processing to modify a sound of interest in a different direction, e.g. see directional vector 75.

Regarding the third operation 53, the directional vector may be determined based on a position of a body part of the user 47 after detection of the predetermined gesture.

For example, the method may comprise determining a position of a selected one of the user's ears and the directional vector may be determined as a straight line extending outwards from the position of the user's ear. The ear that is selected may be based on, for example, one of the ears having a position generally corresponding to one or more sounds and the other ear not having a position generally corresponding to one or more sounds. In an example, below, a leaning motion may be useful for determining which ear to select.

With reference to FIGS. 6 and 7, for example, it is seen that, upon detection of the predetermined gesture, a directional vector 75 may be determined. The position of the user's ear can be determined based on knowledge of, for example, the current orientation of the VR headset 20 and the known location of output transducers (earphones, headphones or speakers) within the VR headset. Alternatively, markers and/or sensors may be placed on the VR headset 20 at the location of the output transducers.

In some embodiments, wherein the abovementioned leaning motion forms part of the predetermined gesture, the ear that is selected for determining the directional vector 75 may be that ear which moves downwards with the downwards leaning motion, as is shown in FIG. 7

Regarding the fourth operation 54, processing the audio data may comprise processing at least part of the audio data such that sounds in the direction of the directional vector are modified by, for example, causing emphasis of sounds in said direction relative to sounds from other directions. This may involve modifying the gain and/or diffuseness of said sounds in said direction. The modifying may occur or may dynamically change (e.g. increase or decrease) in response to the position of the user changing, e.g. moving towards or way from the sound of interest.

For example, the gain of sounds in said direction may be increased and/or the diffuseness decreased as a user moves towards a sound source of interest and vice versa.

In some example embodiments, a further operation may be performed, comprising generating a directional beam pattern in the direction of the directional vector. This may be referred to as beamforming. In the context of Ambisonics or HOA, this may be considered a post-processing or playback processing operation on the audio data.

The processing of the audio data may comprise modifying audio data corresponding to the directional beam pattern, e.g. audio data corresponding to sounds within the directional beam pattern.

For example, for Ambisonics or HOA, the processing may comprise modifying the original Ambisonics or HOA audio data by firstly, using one or more well-known methods, performing beamforming in the Ambisonics or HOA domain in the direction of the directional vector, secondly, panning the beamformed audio signal to the direction of the directional vector in the same Ambisonics or HOA domain and lastly, adding the panned audio signal to the original Ambisonics or HOA audio data.

The well-known methods may involve the use of creating so-called virtual microphones to modify the Ambisonics or HOA audio data into data representing a directive signal. For example, beamforming with Ambisonics or HOA may involve creating a first virtual microphone 5-40 degrees to the left of the directional vector and a second virtual microphone 5-40 degrees to the right of the directional vector. The effect is a spatial stereo effect in the direction of the directional vector. Another method is to provide so-called parametric spatial audio effects. Another method is to provide a beamformed Ambisonics or HOA audio signal (monaural) in the same direction as the directional vector, and then panning the beamformed signal into the same Ambisoncis domain and summing the panned signal with the original signal.

By known processing methods, it is possible, during post-processing or playback to process the audio data to provide a form of beamforming, effectively generating a directional beam pattern such that sounds represented within the generated directional beam pattern can be modified in the fourth operation 54. The generated directional beam pattern can also be modified in terms of its width.

In some example embodiments, for example, a distance, d, may be estimated or determined between the position of the user in the virtual space and the position of the sound source of interest. The generated directional beam pattern may be configured to have a beam width, W, that is dependent on the determined distance d. For example, the beam width W of the generated directional beam pattern may become greater as the determined distance becomes smaller.

The distance, d, may be estimated or determined using metadata that may accompany the audio data or sets of audio data. The metadata could be based on, for example, visual analysis, multi-point capture or other content creation technique whereby, during the capture stage, some estimate of the distance of the audio sources from the VR capture device is derived.

In some example embodiments, the beam width W may be further dependent on a duration of the detected predetermined gesture.

As indicated above, the directional beam pattern may be generated using audio data associated with, for example, one or more audio channels (e.g. corresponding to virtual microphones in the Ambisonics or HOA domain).

Figures 8A, 8B:
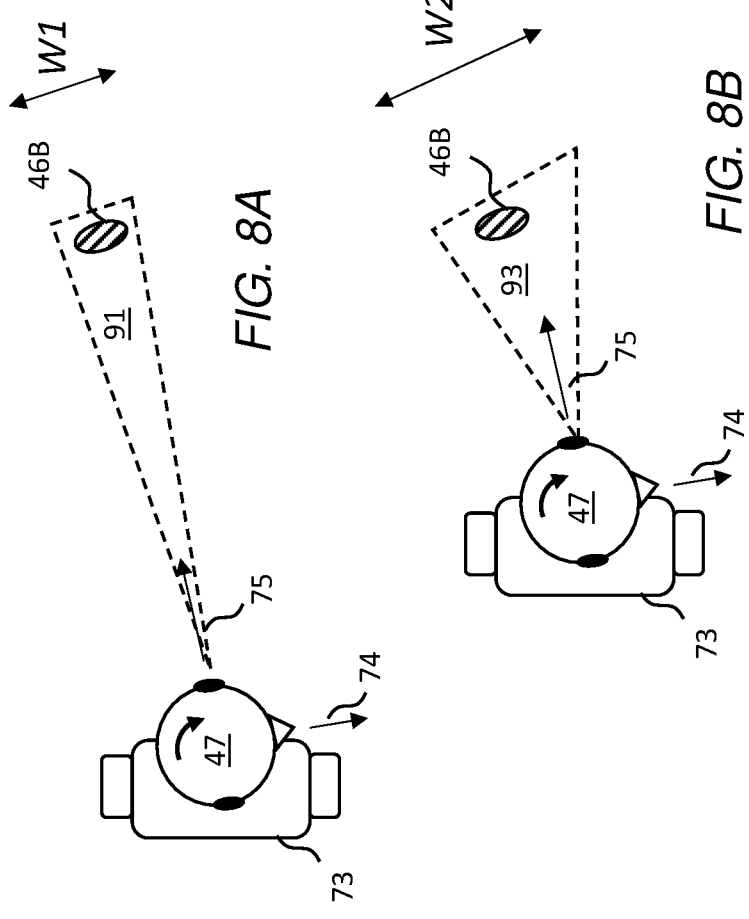
FIG. 8A is a schematic top-plan view of a user for indicating determination of a beam according to some example embodiments.
FIG. 8B is a schematic top-plan view of a user for indicating determination of a wider beam according to some example embodiments.

Referring to FIG. 8A, for example, in response to the detected user gesture referred to above with respect to FIG. 6, the VR processing system 41 may determine the directional vector 75 which is oriented towards the second sound 46B corresponding to the second sound source 36 and generate a directional beam pattern 91 in the direction of said directional vector.

If the distance d is estimated or determined to be, for example, above 10 metres, this may be determined to require a relatively narrow beam (low beam width W1) which may be modified in the fourth operation 54.

Referring to FIG. 8B, as the user 47 moves towards the second sound 46B, the same process may be performed, but as the distance d gets smaller, the determined directional beam pattern may get larger (larger beam width W2) which may correspond to other audio channels (e.g. other virtual microphone positions) being combined with the previous audio data. Such a directional beam pattern is indicated in FIG. 8B with reference numeral 93. In the fourth operation 54, only the audio data corresponding to the determined beam pattern 93 may be modified.

As mentioned, modification in the fourth operation 54 may comprise adding emphasis to the audio data, such as by increasing gain or reducing diffuseness. For example, the amount of gain or diffuseness may also increase, e.g. gradually, based on a duration of the user's gesture. The longer the gesture, the greater the gain. Other modifications may be performed, such as by reducing gain or increasing diffuseness for audio data sets outside of the determined directional beam pattern.

Although beamforming is described in the above example, other forms of direction-dependent enhancement may be performed. E.g. using audio focus, audio zoom and others. For example, the fourth operation 54 may be performed on a parametric representation of the audio data, e.g. HOA data, wherein the data is split into time-frequency tiles. The tiles may comprise frequency "bins" that describe the audio content at constant time intervals and each tile may have parameters that include, for example, gain, direction and diffuseness. When the user-desired direction and beam width, W, are obtained, the gain may be increased in tiles that correspond to the user-desired direction.

Figures 9, 10:
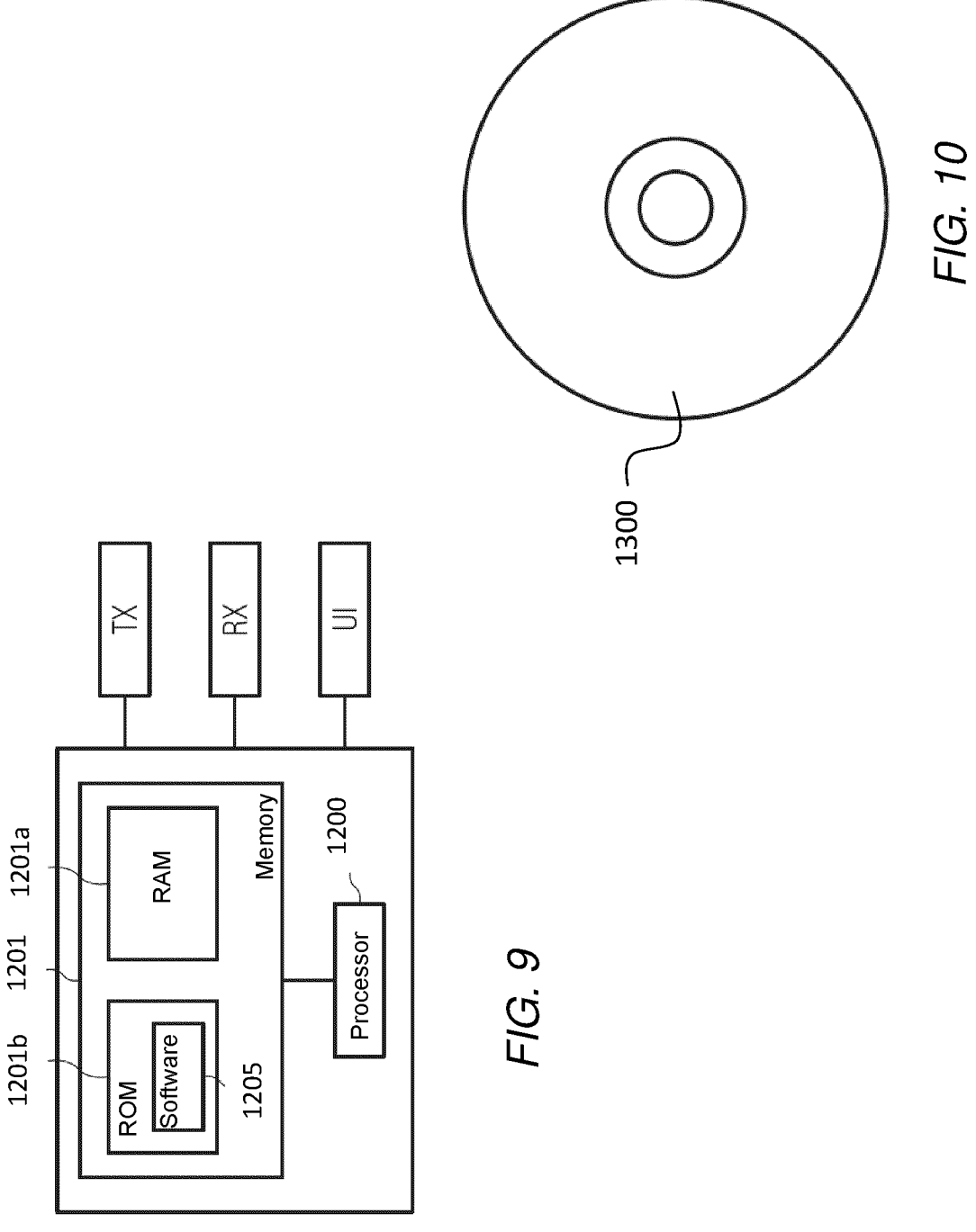
FIG. 9 is a schematic view of an apparatus which may be configured according to one or more example embodiments.
FIG. 10 is a plan view of non-transitory media according to some example embodiments.

In summary, example embodiments may enable interaction or exploration of virtual spaces represented at least in part by spatial audio data which is 3DoF in nature, in a more realistic, immersive and/or interesting way. As the user 47 moves towards or away from a sound in the virtual space, the spatial audio data that is output may dynamically change.
Example Apparatus FIG. 9 shows an apparatus according to some example embodiments. The apparatus may be configured to perform the operations described herein, for example operations described with reference to any disclosed process. The apparatus comprises at least one processor 1200 and at least one memory 1201 directly or closely connected to the processor. The memory 1201 includes at least one random access memory (RAM) 1201a and at least one read-only memory (ROM) 1201b. Computer program code (software) 1205 is stored in the ROM 1201b. The apparatus may be connected to a transmitter (TX) and a receiver (RX). The apparatus may, optionally, be connected with a user interface (UI) for instructing the apparatus and/or for outputting data. The at least one processor 1200, with the at least one memory 1201 and the computer program code 1205 are arranged to cause the apparatus to at least perform at least the method according to any preceding process, for example as disclosed in relation to the flow diagram of FIG. 5 and related features thereof.

FIG. 10 shows a non-transitory media 1300 according to some embodiments. The non-transitory media 1300 is a computer readable storage medium. It may be e.g. a CD, a DVD, a USB stick, a blue ray disk, etc. The non-transitory media 1300 stores computer program code, causing an apparatus to perform the method of any preceding process for example as disclosed in relation to the flow diagram of FIG. 5 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
at least one processor; and
at least one memory storing instructions that, when executed with the at least one processor, cause the apparatus at least to:
provide audio data for output to a user device, the audio data representing a virtual space comprising a plurality of sounds located at respective spatial locations within the virtual space, the plurality of sounds being respectively associated with a plurality of sound sources;

detect a predetermined gesture associated with a user identifying one of the plurality of sound sources to be a sound source of interest;

determine a directional vector between a position of the user, at a time of detecting the predetermined gesture, and a position of the sound source of interest in the virtual space;

generate a directional beam pattern in the direction of the directional vector, wherein the generated directional beam pattern is configured to have a beam width that is dependent, at least partially, on a duration for which the predetermined gesture is detected; and process the audio data such that sounds at least in a direction of the directional vector are modified when output to the user device based, at least partially, on the duration for which the predetermined gesture is detected, wherein processing the audio data comprises causing the apparatus to:

modify at least part of the audio data corresponding to the generated directional beam pattern.

2. The apparatus of claim 1, wherein processing the audio data comprises the instructions, when executed with the at least one processor, cause the apparatus to:

modify the sounds as the position of the user changes.

3. The apparatus of claim 1, wherein the instructions, when executed with the at least one processor, cause the apparatus to:

determine a distance between the position of the user in the virtual space and the position of the sound source of interest, and wherein the beam width of the generated directional beam pattern is further dependent on the determined distance.

4. The apparatus of claim 3, wherein the beam width of the generated directional beam pattern becomes greater as the determined distance becomes smaller.

5. The apparatus of claim 1, wherein processing the audio data comprises the instructions, when executed with the at least one processor, cause the apparatus to:

modify the audio data such that a gain associated with the sounds in the direction of the directional vector is or are increased.

6. The apparatus of claim 5, wherein an amount of modification of the audio data is further dependent on the duration for which the predetermined gesture is detected.

7. The apparatus of claim 1, wherein detecting the predetermined gesture comprises the instructions, when executed with the at least one processor, cause the apparatus to:

detect the predetermined gesture responsive to detecting a change in orientation of at least part of the user's body.

8. The apparatus of claim 7, wherein the instructions, when executed with the at least one processor, cause the apparatus to:

determine an orientation of the user's head, wherein detecting the predetermined gesture comprises the instructions, when executed with the at least one processor, cause the apparatus to:

detect the predetermined gesture responsive to detecting a change in the orientation of the user's head above a predetermined first angular threshold.

9. The apparatus of claim 8, wherein the instructions, when executed with the at least one processor, cause the apparatus to:

determine an orientation of the user's upper body with respect to the user's lower body, wherein detecting the predetermined gesture comprises the instructions, when executed with the at least one processor, cause the apparatus to:

detect the predetermined gesture responsive to further detecting a change in the orientation of the upper body with respect to the lower body above a predetermined second angular threshold indicative of a downwards leaning motion.

10. The apparatus of claim 7, wherein detecting the predetermined gesture comprises the instructions, when executed with the at least one processor, cause the apparatus to:

detect the predetermined gesture responsive to detecting that the changed orientation of the at least part of the user's body is maintained for at least a predetermined period of time.

11. The apparatus of claim 1, wherein the directional vector is determined based on a position of a body part of the user after detection of the predetermined gesture.

12. The apparatus of claim 11, wherein the instructions, when executed with the at least one processor, cause the apparatus to:

determine a position of the user's ear and wherein the directional vector is determined as extending outwards from the user's ear.

13. A method comprising:

providing audio data for output to a user device, the audio data representing a virtual space comprising a plurality of sounds located at respective spatial locations within the virtual space, the plurality of sounds being respectively associated with a plurality of sound sources;

detecting a predetermined gesture associated with a user identifying one of the plurality of sound sources to be a sound source of interest;

determining a directional vector between a position of the user, at a time of detecting the predetermined gesture, and a position of the sound source of interest in the virtual space;

generating a directional beam pattern in the direction of the directional vector, wherein the generated directional beam pattern is configured to have a beam width that is dependent, at least partially, on a duration for which the predetermined gesture is detected; and processing the audio data such that sounds at least in a direction of the directional vector are modified when output to the user device based, at least partially, on the duration for which the predetermined gesture is detected, wherein processing the audio data comprises:

modifying at least part of the audio data corresponding to the generated directional beam pattern.

14. The method of claim 13, wherein the processing further comprises:

modifying the sounds as the position of the user changes.

15. The method of claim 13, further comprising:

determining a distance between the position of the user in the virtual space and the position of the sound source of interest, and wherein beam width of the generated directional beam pattern is further dependent on the determined distance.

16. The method of claim 15, wherein the beam width of the generated directional beam pattern becomes greater as the determined distance becomes smaller.

17. A non-transitory computer readable medium comprising instructions stored thereon for performing at least the following:

providing audio data for output to a user device, the audio data representing a virtual space comprising a plurality of sounds located at respective spatial locations within the virtual space, the plurality of sounds being respectively associated with a plurality of sound sources;

detecting a predetermined gesture associated with a user identifying one of the plurality of sound sources to be a sound source of interest;

determining a directional vector between a position of the user, at a time of detecting the predetermined gesture, and a position of the sound source of interest in the virtual space;

generate a directional beam pattern in the direction of the directional vector, wherein the generated directional beam pattern is configured to have a beam width that is dependent, at least partially, on a duration for which the predetermined gesture is detected; and processing the audio data such that sounds at least in a direction of the directional vector are modified when output to the user device based, at least partially, on the duration for which the predetermined gesture is detected, wherein processing the audio data comprises: modifying at least part of the audio data corresponding to the generated directional beam pattern.

* * * * *